July 9, 1957  F. W. SEYBOLD ET AL  2,798,967
LIGHT INTERRUPTING MEANS FOR PHOTOELECTRIC CONTROL SYSTEM
Original Filed Dec. 9, 1950  3 Sheets-Sheet 1
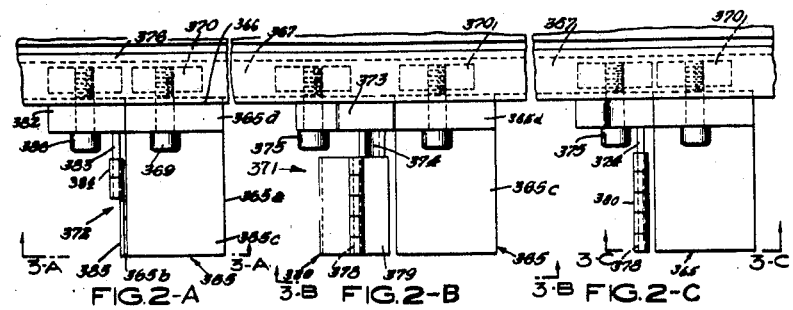
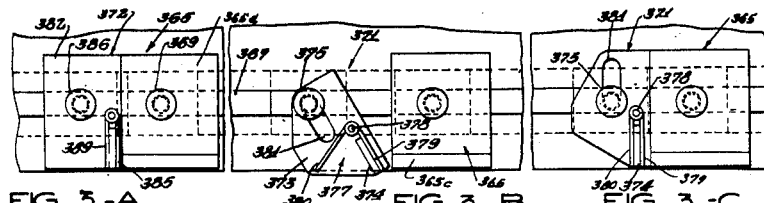
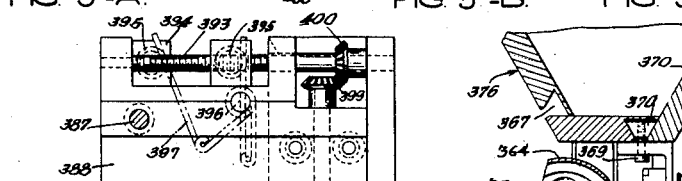
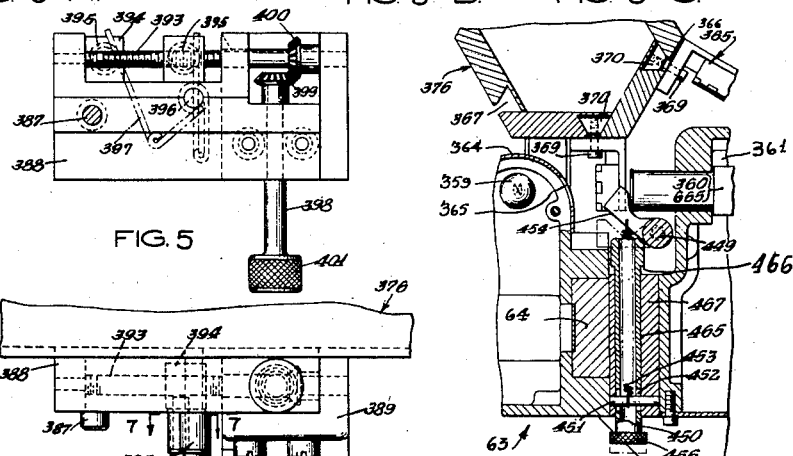
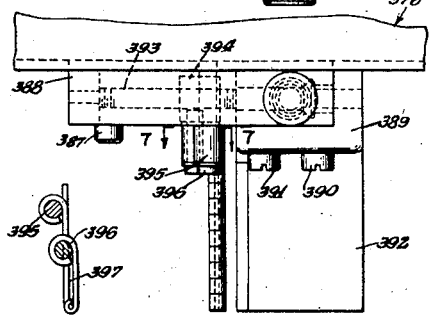
INVENTORS
FREDERICK W. SEYBOLD
NICHOLAS HERMAN
BY Ostrolenk & Faber
ATTORNEYS July 9, 1957  F. W. SEYBOLD ET AL  2,798,967
LIGHT INTERRUPTING MEANS FOR PHOTOELECTRIC CONTROL SYSTEM
Original Filed Dec. 9, 1950  3 Sheets-Sheet 2

INVENTORS
FREDERICK W. SEYBOLD
NICHOLAS HERMAN
BY
Ostrolenk & Faber
ATTORNEYS

July 9, 1957    F. W. SEYBOLD ET AL    2,798,967
LIGHT INTERRUPTING MEANS FOR PHOTOELECTRIC CONTROL SYSTEM
Original Filed Dec. 9, 1950    3 Sheets-Sheet 3

INVENTORS
FREDERICK W. SEYBOLD
NICHOLAS HERMAN
BY
Ostrolenk & Faber
ATTORNEYS

United States Patent Office 2,798,967
Patented July 9, 1957

2,798,967

LIGHT INTERRUPTING MEANS FOR PHOTO-ELECTRIC CONTROL SYSTEM

Frederick W. Seybold, Westfield, N. J., and Nicholas Herman, Bronx, N. Y., assignors to E. P. Lawson Co., Inc., New York, N. Y., a corporation of New York Original application December 9, 1950, Serial No. 200,013, now Patent No. 2,737,158, dated March 6, 1956. Divided and this application July 23, 1953, Serial No. 369,882

3 Claims. (Cl. 250—234)

Our present invention is a division of application Serial No. 200,013 filed December 9, 1950 now Patent #2,737,158, and relates to stop and trip out units, electrical circuits for electrically controlled automatic hydraulic spacing mechanism and more particularly to stop and trim out units and electrical circuits for automatic spacing mechanism specifically designed for use in connection with guillotine type paper cutters. Other patents showing mechanical elements of the machine such as the back gauge, cable attachments, etc., and various features of machines suitable for use with the invention disclosed herein are shown in Patents #2,628,680; #2,053,499; #2,687,011; #2,574,501.

In the operation of guillotine type paper cutters, a pile of paper is placed on the work table beneath the cutting knife. The back gauge usually provided on the work table is then adjusted so that the portion of the pile which is desired to cut off extends forward of the cutting knife edge so that when the knife is brought down, it will cut off an exactly dimensioned section of the pile.

In operating paper cutters of this type, therefore, it frequently becomes necessary to adjust the back gauge many times for different cuts which are to be made. Even if a plurality of regular cuts are to be made from a single pile, the back gauge must be moved up each time in order to ensure that the edges are perfectly squared so that the exact cut may be made.

An object of our invention is the provision of a novel stop unit for a photo-electric cell circuit that controls the automatic back gauge spacing mechanism which moves the back gauge at successive individually predetermined intervals after successive cuts.

By the use of our invention, therefore, the operator need do nothing more than place the initial pile of paper on the machine against the back gauge and arrange a program of stop units. The operator then operates the paper cutter each time a signal lamp flashes so that the knife moves up and down the desired number of times to cut the desired number of piles.

A further object of our invention is to provide a signal light which will indicate to the operator that the back gauge has come to the predetermined stop.

The program of stop units will control the spacing mechanism so that the back gauge driving mechanism automatically moves the back gauge the proper distance at the end of each cut and before the next cut is started.

Our invention is directed specifically to stop units and electrical circuits. The stop units interrupt a light beam and thus permit the electrical circuit to exercise proper control of the electrically controlled elements for successively moving the back gauge by predetermined intervals after individual cuts.

The stop and trim out units are used in conjunction with a carriage moving transversely across the front of the cutting machine in synchronism with the movement of the back gauge and moves with a speed equal to that of the back gauge.

A photo-sensitive medium, such as a photo-electric tube, and a light source are borne by the carriage across the front of the machine and a stationary program of stop units is located between the light source and the photo-sensitive medium.

A hydraulic driving mechanism is provided for the back gauge and is controlled by the novel electrical circuits of our invention. The electrical circuits are switched on and off to control the driving mechanism by the manner in which light falls on the photo-sensitive medium as determined by the program of stop units.

In its simplest form, the stop units are rectangular members, the left-hand edges of which are each spaced from each other by the exact distance which the back gauge is to travel between successive cuts.

In another form, the program of stop units can be reproduced and replaced by a transparent regulating strip which is provided with a plurality of successive rectangular opaque sections, the left-hand edges of which also may be spaced from each other by the exact distance which the back gauge is to travel between successive cuts.

When the operation of the back gauge is initiated, a light beam passes in the space between stop units or through the rectangular transparent area of the regulating strip. This operation takes place at full speed to drive the back gauge forward rapidly. At the same time, the carriage is driven transversely from right to left at equal speed through cable attachments to the back gauge.

When light from the light source is first interrupted by the right-hand edge of the stop unit or the right-hand edge of the opaque section in the regulating strip, circuits are operated to reduce the forward speed of the back gauge and the carriage to a slow speed.

When the light from the light source is again permitted to impinge upon the photo-electric cell by the left-hand edge, a heavy pile of paper may be brought up rapidly by the back gauge to near the point where it is to be stopped. Thereafter, it is slowed down and then finally brought to a stop. The slow-down interval prevents a sudden stop of the back gauge from causing a paper pile to cross beyond the predetermined position.

Thus, the final speed of the back gauge and its carriage may be as little as 1% of the speed at which the paper pile is brought up close to the stopping point.

Thus, the width of the rectangular stop units depends on the rapidity with which the electric relays, solenoids, and valves respond to the light signals to slow down the paper pile sufficiently so that it will be stopped accurately.

Preferably, the initiation of the back gauge operation is so arranged that the lifting of the knife and clamp clear of the paper pile will set the apparatus in motion by means of a knife switch, although a by-pass switch may be provided so that the back gauge may be set in motion manually when desired.

The primary object of our invention is the provision of a novel construction and adjustment of stop units set between a photo-sensitive medium and a light source which moves synchronously with the back gauge to alternately interrupt and permit passage of the light beam at predetermined positions of the back gauge. The control elements are so arranged that the first change in the light conditions due to the right-hand edge of the stop unit after the initiation of fast operation will cause the back gauge to be slowed down and the second change in the light condition due to the left-hand edge of the stop unit after initiation of the operation will cause the back gauge to be stopped. That is, the darkening of the photo-sensitive medium will cause a slow down and the relighting of the photo-sensitive medium will cause the hydraulic means to stop the back gauge.

When the cutting machine is called upon to cut labels or other material printed upon the sheets of the pile of paper, the back gauge is required to move forward an inch or more between each cutting operation. However, on printed sheets where many rows of labels or the like appear, there is also found a small strip of between 1/16″ to 3/4″ which is unprinted. These unprinted strips are due to the plate hooks which are located between adjacent printing plates to clamp these plates to the printing cylinder as is well-known in the art. Hence, after the back gauge has been moved forward several cycles of fast and slow speed to cut a series of printed label rows, it becomes necessary that the back gauge move forward only a fraction of an inch to permit the cutting of the small unprinted strips. Therefore, it is necessary that the back gauge start to move forward at a slow speed and then come to a stop.

For this purpose a time delay relay is incorporated in the electric circuit whereby the back gauge moves forward at slow speed for a fraction of a second so that the photo-sensitive medium will be darkened in case the next adjacent stop unit is only a short distance from the preceding one before the hydraulic means is conditioned for fast forward speed. If the back gauge were to start moving forward at a fast speed, the inertia of the system would not permit it to stop accurately after a fractional inch of travel and thus the cutting operation would not take place at the proper location on the pile of paper.

For the purpose of trimming out these small strips of unprinted paper, a special light beam interrupting unit is provided. This special means is called a trim out unit which controls the back gauge movement in such a manner that it will start to move forward from a stopped position at a slow speed, travel the fractional inch of the unprinted strip and then come to a stop.

Another object of our invention is a novel construction and adjustment of a trim out unit to be used with the heretofore mentioned stop units. The trim out unit is placed to the left of a stop unit so that the distance between the right edge of the former and the left edge of the latter forms a narrow slit.

Our invention is used in conjunction with a novel electrical circuit in which a time delay relay is incorporated to function in coordination with trim out units to permit trim out operation at slow speed, as disclosed in aforementioned Patent No. 2,737,158.

The movement of the back gauge is described in detail in Patent No. 2,737,158 in coordination with the carriage which carries the photo-electric unit, a description of the general operation and coaction being now given.

The carriage is to the right of the stop unit, as viewed by an operator facing the front of the machine. Full light impinges upon the photo-electric cell so that after a cutting operation is completed upward movement of the knife blade will initiate slow speed for a fraction of a second to be followed by fast forward movement of the back gauge. Due to the cable attachment between the back gauge and carriage, the carriage will move to the left and when it reaches the right-hand edge of the stop unit, the light beam will be interrupted by the stop unit to cause the back gauge to now move forward at a slow speed. As the back gauge continues to move slowly forward and the carriage reaches the left-hand edge of the stop unit, the light beam will again be permitted to impinge upon the photo-electric cell and thus cause the hydraulic system to bring the back gauge to an accurate stop.

Assuming that a trim out unit is adjacent the stop unit, a slit of only a fractional inch will exist between these two units through which the light beam will pass. If a green light signal has flashed, indicating that an accurate stop has been made, the operator can then start the cutting operation. When the knife blade on its return upward movement closes the knife switch, it will initiate slow speed of the back gauge for a fraction of a second. However, within this fractional second period, the carriage will reach the right-hand edge of the trim out and the light beam will again be interrupted. As heretofore noted, this will permit the back gauge to continue to advance at a slow speed until the light beam and carriage reach the left-hand edge of the trim out unit. At this point, the light beam again permitted to impinge upon the photo-electric cell and will cause the electrically controlled hydraulic driving mechanism to bring the back gauge to a stop. If the green signal light indicates that an accurate stop has been made, the cutting operation can take place to trim out the strip of unprinted paper. Since the carriage comes to a stop at the left-hand edge of the trim out unit where light can impinge upon the photo-electric cell, the electrical circuit is in condition to cause the hydraulic driving mechanism to move the back gauge forward as described before.

The stop units and more particularly the trim out units must be properly adjusted individually in accordance with the desired spaced cutting operations required. In addition, these units must be adjusted and positioned with respect to each other and thus a combination member containing both a stop unit and a trim out unit is provided.

Our invention provides a novel blocking member and control which is mounted and controlled from the carriage and is used for positioning the stops on the hexagonal bar relative to the photo-sensitive medium which is attached to the carriage. The back gauge and carriage are moved to the predetermined cutting location, and the blocking member is manually moved in the path of the units. A unit is then moved along the stationary hexagonal bar until it engages the blocking member. This location of the unit on the hexagonal bar will then be in proper predetermined position relative to the photo-tube and it may then be securely fastened to the bar at this point.

Accordingly, another object of our invention is to provide a blocking member and control so that the stop unit may be positioned properly on the hexagonal bar so that a program of stop units may be arranged to result in the required spaced movements of the back gauge.

The foregoing and many other objects of our invention will become apparent in the following description and drawings in which:

Fig. 1 is a sectional view showing the relationship of the photo-cell, light source, and stop unit.

Figure 2A is a side view of a novel combination stop unit and trim out unit of our invention.

Figures 2B and 2C are side views of another novel combination stop unit of our invention. Figure 2B shows the trim out unit adjusted for maximum trim out and Figure 2C for minimum trim out.

Figure 3A is a bottom view of the novel combination stop unit of Figure 2A.

Figures 3B and 3C are bottom views of the novel combination stop unit of Figures 2B and 2C.

Figure 5 is a top view of a novel combination stop unit of our invention showing the adjustment means for the trim out unit.

Figure 6 is a front view of the novel combination stop unit of Figure 5.

Figure 7 is a view taken along section 7—7 of Figure 6.

Figures 8, 9:
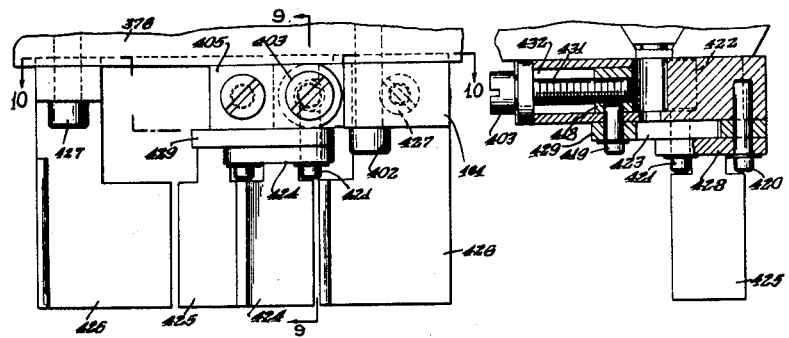
Figure 8 is a front view of another novel combination stop unit of our invention.
Figure 9 is an end view taken along line 9—9 of Figure 8.

Referring to Fig. 1, a photo-tube 360 and light source 359 are supported on carriage 63 which moves in synchronization with a back gauge, all as described in our prior Patent No. 2,737,158.

The carriage 63 travels along the bar 64 due to the motion imparted to it by the cables as heretofore described in the aforementioned patent. That is, the movement of the back gauge is duplicated by the carriage 63 so that when the back gauge is all the way back, the carriage 63 is all the way to the right and as the back gauge moves forward, the carriage 63 will move to the left. The carriage 63 carries the housing 364 in which is mounted a light source 359. A slit 365 in the housing 364 permits the light from source 359 to travel directly to a photo-electric cell 360. The photo-electric cell 360 is mounted horizontally in the housing 361 which in turn is rigidly attached to the carriage 63.

The photo-electric cell is either illuminated or dark and the change from one to the other is responsible for the control of the hydraulic system. Preferably, the photo-electric cell 360 is illuminated when the back gauge is travelling at high speed. When this illumination is interrupted by a signal unit and the photo-electric cell is dark, the photo-electric will cause the electric circuit to slow down the hydraulic motor. When the photo-electric cell is again illuminated, it will cause the hydraulic motor to stop.

*First stop unit*

One type of stop unit is illustrated in Figures 2A and 3A as stop unit 365. L-shaped stop unit 365 has a long leg 365c and a short leg 365d which is provided with a tongue 366 which fits into the dove tail groove 367 and properly aligns the stop as seen in Figure 1. The stop unit 365 is clamped to the hexagonal bar 376 by means of screw 369 and wedge-shaped nuts 370 as may best be seen in Figure 1. The right-hand edge 365a of leg 365c serves to interrupt the light beam when the carriage 63 is at a predetermined location.

When the carriage 63 is at the right of the stop unit 365, there will be no obstruction to the beam of light from source 359 and the back gauge will be moving forward at high speed. As the carriage continues to move to the left, the beam of light will be interrupted by the right-hand vertical edge 365a.

Thus, the photo-electric cell 360 will be darkened and by means of amplifier tubes and relays will cause the electrically controlled driving member to change to a slow speed. Since the back gauge is travelling at a linear speed of about seven inches per second, and an appreciable amount of time is required for the relays and drive member to respond to this signal, the carriage 63 will travel about 75–90% of the width of the stop unit 365c before the back gauge motor and back gauge assume a slow speed. As the carriage 63 travels past the left-hand vertical edge 365b, the stop unit 365c again permits the beam of light to reach the photo-electric cell 360 and on this signal the photo-electric cell circuit will cause the back gauge to come to a stop. However, after the photo-electric cell 360 has received this second signal, the back gauge and carriage 63 will travel a certain distance beyond the left-hand edge 365b before coming to a complete halt. This is due primarily to the inertia of the system.

*Introduction to trim outs*

In the process of printing a sheet of labels on which many rows of labels appear, there will also be found strips of unprinted portions of paper. These strips are due to the space between adjacent printing plates which must be allowed between these plates to place the plate hooks which clamp the plates to the printing cylinder or base.

Thus, after a cutting operation when the back gauge need only move forward a fraction of an inch to cut these unprinted strips, it becomes necessary that the back gauge move forward only in a slow speed.

As heretofore mentioned, after the second signal has been received, the carriage 63 travels a short distance beyond the stop edge 365b before coming to a complete stop. Therefore, if another stop unit is placed at the left of stop unit 365, there will remain only a narrow slit or space for the light beam to pass between the two stops. Thus, as the photo-electric cell 360 received the second signal at edge 365b, it will travel past this edge a small amount before the back gauge 201 comes to a stop. Hence, when forward movement of the back gauge is again initiated, the carriage 63 will reach the right-hand edge of the trim out 385 before the timer mechanism 580 has closed its contacts. Hence, as hereinbefore described, the back gauge will continue forward at a slow speed and permit a trim out cut to be made when it comes to a stop at the left-hand edge of trim out unit 385.

Since the trim out may be as small as 1/16" or as large as 3/4" two adjustable trim out units 371 and 372 are provided. The trim out unit 371 is suitable for widths of 3/16" to 3/4", while trim out unit 372 is suitable for widths of 1/16" to 3/16".

Figs. 2A and 3A show elevation and plan views respectively of trim-out unit 372, in light-transmitting position. The trim-out unit 371 is shown in elevation in light-blocking position in Fig. 2B and in light-transmitting position in Fig. 2C. Figs. 3B and 3C are plan views of the positions shown respectively in Figs. 2B and 2C.

Referring to Figures 2B, 2C, 3B, 3C, and 4, the trim out unit 371 has a base 373 from which a thin rectangular leg 374 projects. A screw 375 connects the stop unit 371 by means of base 373 to the hexagonal bar 376 in a manner heretofore described. The hinge 377 is rigidly attached to the rectangular leg 374. The other leg 380 of hinge 377 is rotatable about the pin 378. The base 373 has an elongated slot 381 cut therein and the attachment screw 375 passes through this slot.

The stop unit 371 thus has three degrees of adjustment (1) it may be located by the screw 375 at any location in the slot 367 (Fig. 1) of the hexagonal bar 376; (2) the hinge 377 may be opened or closed to determine the length of time that the photo-electric cell 360 will be dark to permit slow speed of the drive member.

Thus, in the hinge open position of Figures 2B and 3B it would produce a slow forward movement of the back gauge of 3/4" whereas the hinge closed position of Figures 2C and 3C will give only a 3/16" forward movement; (3) due to the length of slot 381, the base of the stop unit 371 can be rotated and still maintain the outer edge of the hinge 377 in alignment with the edge 365b of stop 365. This rotation of the base 373 permits the adjustment of the slot or space between the two units 365 and 371 as may best be seen by comparing Figures 3B and 3C or Figures 2B and 2C.

*Second trim out*

For very small widths of 1/16" to 3/16" the trim out unit 372 is used as may be observed in Figures 2A and 3A. The base 382 is connected to hexagonal bar 376 by the bolt 386 in a manner heretofore explained and has a thin short rectangular leg 383 projecting therefrom. The short hinge leg 384 is rigidly attached to this rectangular leg 383 while the longer leg 385 is adjustable for the interruption of the light beam.

*Introduction to combination*

The two trim outs 371 and 372 each have a small hinge which may be opened or closed depending upon the width of the narrow unprinted strip of paper which is to be cut or trimmed out from the printed paper. However, since these trim out units must be adjusted to rather close limits, it is desirable to provide a more positive and more practical method of adjustment.

In addition to a trim out unit with an accurate and precise adjustment, it is also desirable to combine this with a stop unit as an integral member thus alleviating some of the positioning problems involved.

First combination

One trim out stop combination unit is illustrated in Figures 5, 6 and 7. The base 388 is secured to the hexagonal bar 376 by means of screw 387 in a manner heretofore explained. To this base 388 is fastened the short leg 389 of a standard stop unit by means of screws 391. The long leg 392 of the standard stop unit interrupts the light beam as best seen in Figure 6.

An adjustment screw 393 is journalled in the base 388 and leg 389. A nut 394 with a stem 395 is threaded on the adjustment screw 393. A stem 396 projects downwardly and at its upper end is rigidly attached to the base 388. A hinge 397 is fitted over the stems 395 and 396 as is best seen in Figure 7. An adjustment shaft 398 is journalled in the base 388 and its end is fastened to a mitre gear 399 which meshes with a similar mitre gear 400 fastened to the screw 393. At the other end of the adjustment shaft 398 is located the knob 401.

Thus, when the knob 401 is turned, the adjustment shaft 398 by means of mitre gears 399 and 400 will cause the adjustment screw 393 to rotate. This will cause the guided nut 394 to move along the axis of screw 393 and thus open or close the hinge 397 depending on the direction of rotation of knob 401.

The position of the part of the solid lines of Figure 5 indicates the open position of the hinge 396 when it interrupts the light beam for the longest period of time. The dotted lines of Figure 5 and the position of Figures 6 and 7 show the hinge in closed position when it interrupts the beam of light for the least period of time.

Second combination unit

A second design for the adjustable combination of a standard stop unit and a trim out stop unit is illustrated in Figures 8, 9, 10, 11, and 12. This combination unit is constructed as follows: The base 404 is connected to the hexagonal bar 376 by the screw 402 in a manner heretofore explained. The standard stop unit 426 is attached to the right of this base 404 by the screw 427. At the left of the base 404 is mounted the trim out stop unit. A pin 420 is perpendicularly mounted and rigidly attached to the base 404. A guide groove 423 is provided in this base unit 404 and has the cylindrical guide pin 422 located within. An extension pin 421 extends vertically down from the cylindrical guide 422.

Figures 10, 11:
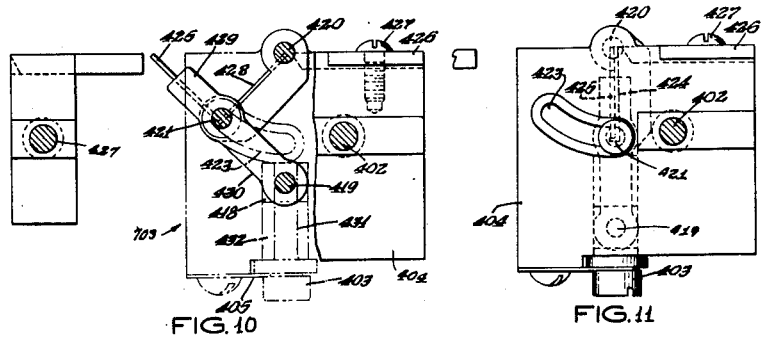
Figure 10 is a view taken along line 10—10 of Figure 8 showing the trim out unit in open position.
Figure 11 is a view similar to Figure 10 showing the hinges of the trim out unit in closed position.
Figures 4, 12:
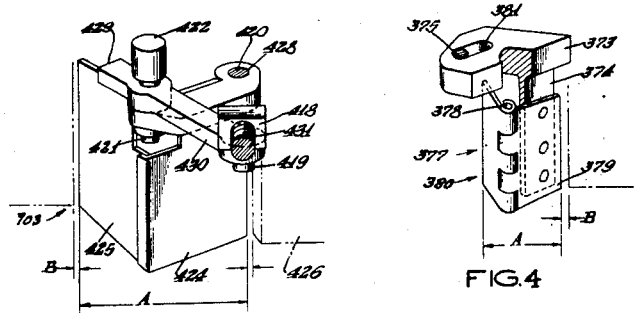
Figure 4 is a perspective view of Figures 3B and 3C showing the hinge construction of the trim out unit.
Figure 12 is a perspective view of the trim out unit of Figures 10 and 11 showing the links and construction.

Pivotally mounted on this pin 421 are the two members 428 and 429. The member 428 is pivotally mounted at its other end on the extension pin 420. The blades 424 and 425 are rigidly attached to the lower side of the members 428 and 429, respectively, and form the hinge of a trim out unit. Hence it will be observed that when the extension 430 of member 429 is moved down as viewed in Figure 10, the blades 424 and 425 will move to a closed position as seen in Figure 11.

For this purpose of controlling the position of the blades 424 and 425, the adjustment screw 431 is provided. This adjustment screw 431 is confined in the body 404 by means of the retaining plate 405. A nut 418 is threaded on the screw 431 and rides in groove 432 of the base 404. A pin 419 projects from the nut 418 and is the pivot for the extension 430 of member 429.

The hinges 424 and 425 of this trim out unit may thus be opened and closed as follows: If the hinge is in the position of Figure 10 and the head 403 of the adjustment screw 431 is turned in the proper direction, the nut 418 due to its threaded engagement with the screw 431 will be guided down this screw by the guide walls of groove 432. This will cause the members 428 and 429, 430 to move in a vertical position as noted in Figure 11. In this position the hinge of blades 428 and 429 will be closed and have the smallest trim out width possible.

Third combination unit

Figures 13, 14, 15:
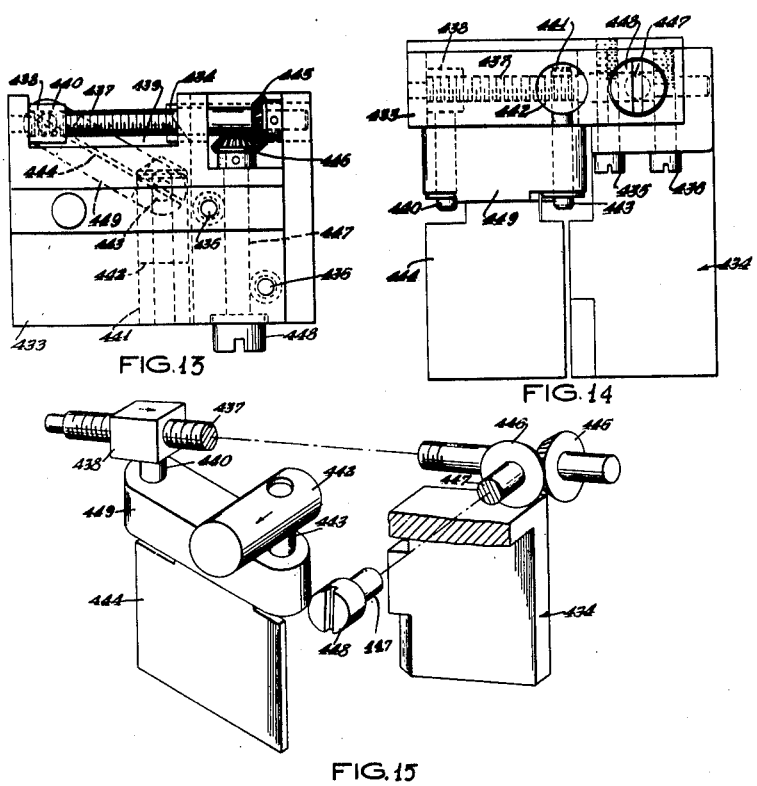
Figures 13, 14 and 15 are a top, front and end view respectively, of a novel modified combination stop unit of our invention.

The combination unit of Figures 13, 14, and 15 is designed for trim out as small as 1/16". In this unit the base 433 is attached to the hexagonal bar 376 in the same manner as heretofore described.

A standard stop unit 434 is attached to the base 433 by means of screws 435 and 436. An adjustment screw 437 is journalled in the base 433 and the stop unit 434. A nut 438 with a pin 440 perpendicularly and rigidly attached thereto is threaded on the screw 437 and is guided in the groove 439 of the base 433. In slot 441 of the base 433 is a guide 442 from which a second pin 443 is perpendicularly and rigidly attached.

A member 449 is pivotally mounted at its ends on these pins 440 and 443. The blade 444 is rigidly mounted on the lower side of the member 449 in a slot located therein.

As seen in Figure 13, if the nut 438 is caused to move to the right, the right end of member 449 will be guided down by the pin 443 and guide 442. This will thus alter the angle of the blade and, therefore, alter the trim out dimensions. Control of the nut 438 is accomplished by bevel gears 445 and 446, shaft 447 and head 448. The shaft 447 is mounted in the base 433 and is terminated at one end on head 448 and at the other end in bevel gear 446. The adjustment screw 437 is also terminated at one end with a rigidly attached bevel gear 445 that is in mesh engagement with bevel gear 446.

Hence, when the head 448 is turned, by hand or screw driver, the shaft 447 will rotate and translate rotation to adjustment screw 437 by means of bevel gears 446 and 445. Hence, if the head 448 is rotated in one direction, the nut 438 will be found to move along the axis of screw 437. Hence, when the nut 438 is in the extreme right position, the blade 444 will be perpendicular to the screw 437 and will produce the shortest possible trim cut movement of the back gauge.

Positioning of stop units

Thus far we have described the purpose, construction and adjustment of the trim out and stop units. However, these units must be properly located on the hexagonal bar 376 before the cutting machine can be put in operation. Means are provided whereby these trim out and stop units can be properly positioned on the hexagonal bar 376, as fully disclosed in our Patent No. 2,737,158 and as generally described hereinafter.

The back gauge and carriage are moved to a position where it is desired to cut the paper stack. At this point a blocking member is interposed in the plane of the stop unit. The holding screw 369 and its associated wedge nut 370 are loose to permit the operator to slide the stop unit along the dovetail groove 367. When the stop unit is moved along the groove 367 to the point where it engages the blocking member, the operator will know that it is properly placed and can thus lock the stop unit in place by means of screw 369 and wedge nut 370.

One phase of our invention concerns itself with the blocking member and how it is placed in the plane of the stop unit as will now be described.

First positioning

As may best be seen in Figure 1, a cylindrical bore 465 is provided in the carriage 63 and a hollow cylindrical tube 450 is fitted therein. Thus, tube 450 has diametrically located slots 452 to permit pin 451 to enter therethrough. The pin 451 is rigidly attached to the carriage 63 so that the slots 452 limit the upward and downward movement of the tube 450. A flanged portion 466 on tube 450 is also provided to limit the downward travel of tube 450 by engagement with surface 467 of carriage 63.

The blocking member 454 is pivoted on pin 449. The blocking member 454 is biased downward against the tube 450 and thus out of the path of the stop units.

When the operator wishes to place the blocking member in the path of the stop units so that these units can be set, the knurled head 456 of tube 450 is pushed upward. Since this head 456 is an integral part of the tube 450, it will also move up, pushing the blocking unit 454 clockwise against the bias of spring 453 to the position of Figure 1. The stop unit 365 can now be brought into contact with the blocking member 454 and locked in place on the hexagonal bar 376 by means of screw 369 and wedge nut 370.

After the stop unit 365 is properly placed, the knob 456 is released to permit the tube 450 and blocking member 454 to return to the position wherein the stop unit 365 is free to move past the blocking member 454 and thus other stop units can then be positioned.

Since many variations and modifications of our invention will now be obvious to those skilled in the art, we prefer to be bound not by the specific disclosures herein contained but only by the appended claims.

We claim:

1. A photoelectric system for controlling start and stop positions of a movable element in a machine, comprising a light source and a photoelectric cell for receiving a beam of light from said light source, said photoelectric cell and said light source being movable as a unit in synchronization with said movable element, means for interrupting said beam comprising a first light interrupting member, means for positioning said member at selected points along the path of traverse of said beam, a second light interrupting means adjacent said first interrupting member and spaced therefrom and comprising a rotative plate adjustably rotatable with respect to said beam, including means for spacing said light interrupting members bodily with respect to each other.

2. A photoelectric system as set forth in claim 1 comprising an additional plate to which said first-mentioned rotative plate is pivotally attached and means for adjusting said additional plate with respect to said first light interrupting member.

3. A photoelectric system as set forth in claim 2, said latter means comprising a base member, said rotative plate and said additional plate being carried thereby, said base member being rotatively adjustable with respect to said first light interrupting member.

References Cited in the file of this patent

UNITED STATES PATENTS

| | | |
|---|---|---|
| 1,901,677 | Taylor | Mar. 14, 1933 |
| 2,053,499 | Seybold et al. | Sept. 8, 1936 |
| 2,215,211 | Devol | Sept. 17, 1940 |
| 2,438,098 | Tandler et al. | Mar. 16, 1948 |
| 2,557,691 | Rieber | June 19, 1951 |
| 2,604,597 | Cahusac et al. | July 22, 1952 |
| 2,628,680 | Seybold | Feb. 17, 1953 |
| 2,649,155 | Spiller | Aug. 18, 1953 |
| 2,665,388 | Bickley | Jan. 5, 1954 |